US011299868B2

(12) United States Patent
Takigawa et al.

(10) Patent No.: US 11,299,868 B2
(45) Date of Patent: Apr. 12, 2022

(54) HYBRID WORK MACHINE

(71) Applicant: Hitachi Construction Machinery Co., Ltd., Tokyo (JP)

(72) Inventors: Yoshiyuki Takigawa, Tsuchiura (JP); Kentaro Itoga, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 315 days.

(21) Appl. No.: 16/493,079

(22) PCT Filed: Aug. 10, 2018

(86) PCT No.: PCT/JP2018/030130
§ 371 (c)(1),
(2) Date: Sep. 11, 2019

(87) PCT Pub. No.: WO2019/044468
PCT Pub. Date: Mar. 7, 2019

(65) Prior Publication Data
US 2020/0063400 A1 Feb. 27, 2020

(30) Foreign Application Priority Data

Aug. 31, 2017 (JP) .............................. JP2017-168093

(51) Int. Cl.
*E02F 9/20* (2006.01)
*B60W 10/06* (2006.01)
(Continued)

(52) U.S. Cl.
CPC ........... *E02F 9/2075* (2013.01); *B60W 10/06* (2013.01); *B60W 10/08* (2013.01); *B60W 20/15* (2016.01);
(Continued)

(58) Field of Classification Search
CPC ..... E02F 9/2075; E02F 9/2004; B60W 20/17; B60W 10/06; B60W 10/08
See application file for complete search history.

(56) References Cited

U.S. PATENT DOCUMENTS

2008/0254939 A1* 10/2008 Ichimura ................. F02D 29/04
477/107
2010/0186713 A1* 7/2010 Kawaguchi ............. F04B 17/05
123/350
(Continued)

FOREIGN PATENT DOCUMENTS

EP 2 314 848 A1 4/2011
EP 2 955 283 A1 12/2015
(Continued)

OTHER PUBLICATIONS

International Search Report (PCT/ISA/210) issued in PCT Application No. PCT/JP2018/030130 dated Nov. 20, 2018 with English translation (five (5) pages).
(Continued)

*Primary Examiner* — Thomas G Black
*Assistant Examiner* — Sara J Lewandroski
(74) *Attorney, Agent, or Firm* — Crowell & Moring LLP

(57) ABSTRACT

A hybrid work machine is configured with an engine 41, a hydraulic pump 51, a hydraulic actuator, a generator motor 61 coupled to the engine 41, an electric storage device 62 that transmits and receives electric power to and from the generator motor 61, an engine controller 42 that controls the engine 41 based on a target engine revolution speed, a power controller 63 that controls action of the generator motor 61, a controller 72 that controls the engine controller 42 and the power controller 63, and a target engine revolution speed change instructing device that give instructions on a change in the target engine revolution speed. The controller 72 controls the engine controller 42 and the power controller 63

(Continued)

to act the generator motor 61 as a generator until an actual revolution speed of the engine 41 is reduced to a revolution speed corresponding to a target engine revolution speed after change if the target engine revolution speed has been changed to be lower while the engine 41 is in an unloaded state. It is thereby possible to suppress noise of the engine in the case where the target engine revolution speed has been changed to be lower while the engine is in an unloaded state.

6 Claims, 9 Drawing Sheets

(51) Int. Cl.
  *B60W 10/08* (2006.01)
  *B60W 20/40* (2016.01)
  *B60W 20/17* (2016.01)
  *B60W 20/15* (2016.01)
  *E02F 3/32* (2006.01)
  *F02D 29/04* (2006.01)
  *F02D 29/06* (2006.01)

(52) U.S. Cl.
  CPC ............ *B60W 20/17* (2016.01); *B60W 20/40* (2013.01); *E02F 9/2004* (2013.01); *B60W 2710/0644* (2013.01); *B60W 2710/0672* (2013.01); *E02F 3/32* (2013.01); *F02D 29/04* (2013.01); *F02D 29/06* (2013.01)

(56) References Cited

U.S. PATENT DOCUMENTS

| | | | | |
|---|---|---|---|---|
| 2011/0098873 A1* | 4/2011 | Koga | .................... | E02F 9/2246 701/22 |
| 2011/0167811 A1* | 7/2011 | Kawaguchi | ........... | F02D 41/021 60/395 |
| 2014/0020375 A1* | 1/2014 | Fujishima | ............. | B60W 10/06 60/431 |
| 2014/0290237 A1* | 10/2014 | Yoshida | ................ | E02F 9/2225 60/452 |
| 2015/0354170 A1* | 12/2015 | Ishihara | ................ | E02F 9/2217 701/22 |
| 2016/0076227 A1* | 3/2016 | Hoshino | ................. | B60L 15/20 701/22 |
| 2017/0274755 A1* | 9/2017 | Yoshida | ................ | B60W 10/30 |

FOREIGN PATENT DOCUMENTS

| | | | |
|---|---|---|---|
| EP | 2 995 727 A2 | | 3/2016 |
| JP | 2003028071 A | * | 1/2003 |
| JP | 2004-150305 A | | 5/2004 |
| JP | 2004-150306 A | | 5/2004 |
| JP | 2009-74406 A | | 4/2009 |
| JP | 2016-108762 A | | 6/2016 |
| JP | 2016-160662 A | | 9/2016 |
| WO | WO 2013/080825 A1 | | 6/2013 |

OTHER PUBLICATIONS

Japanese-language Written Opinion (PCT/ISA/237) issued in PCT Application No. PCT/JP2018/030130 dated Nov. 20, 2018 (four (4) pages).

Extended European Search Report issued in European Application No. 18852259.3 dated May 14, 2021 (eight (8) pages).

International Preliminary Report on Patentability (PCT/IB/338 & PCT/IB/373) issued in PCT Application No. PCT/JP2018/030130 dated Mar. 12, 2020, including English translation of document C2 (Japanese-language Written Opinion (PCT/ISA/237) previously filed on Sep. 11, 2019) (eight (8) pages).

* cited by examiner

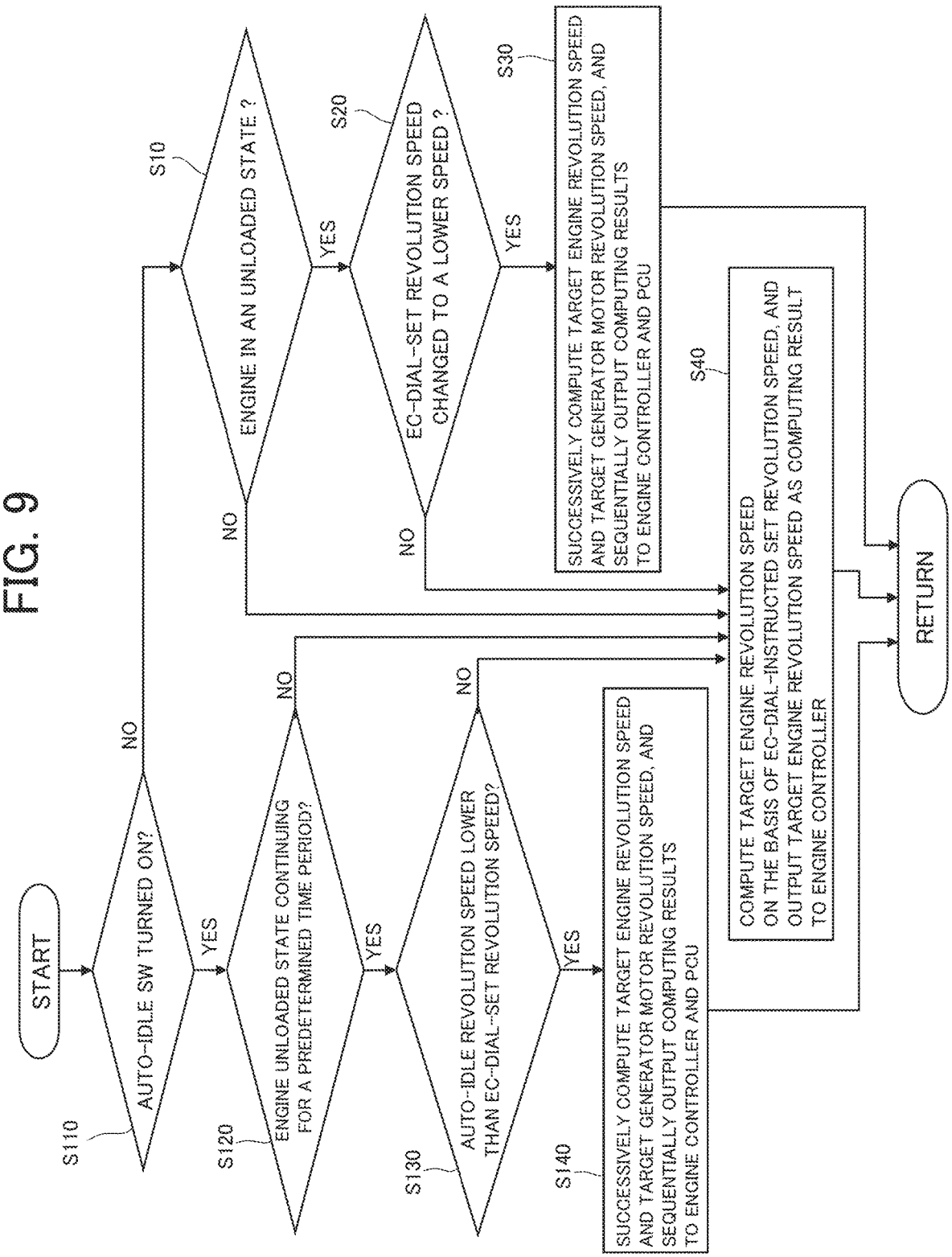

HYBRID WORK MACHINE

TECHNICAL FIELD

The present invention relates to a hybrid work machine mounting an engine and a generator motor and to engine revolution speed control in a hybrid work machine.

BACKGROUND ART

In work machines such as a hydraulic excavator and a crane, there is known a hybrid work machine mounting an engine and a generator motor. Generally, in control over output power of the engine mounted in a work machine, an engine revolution speed and a fuel injection amount (torque) are regulated in response to a magnitude of a load applied to the engine in such a manner as to maintain a target engine revolution speed instructed by an engine revolution speed instructing device configured with a dial and the like.

In a case of such control, the fuel injection amount is regulated in such a manner as to maintain the instructed target engine revolution speed even while the work machine is not in operation; thus, there are problems with low fuel efficiency and great noise. To improve the fuel efficiency and reduce the noise, there is known a technique for automatically reducing the engine revolution speed not to the target engine revolution speed instructed by the engine revolution speed instructing device but to a predetermined engine revolution speed lower than the target engine revolution speed when the work machine is not in operation, for example, when all operation levers are returned to neutral positions (refer to, for example, Patent Document 1).

PRIOR ART DOCUMENT

Patent Document

Patent Document 1: JP-2004-150305-A

SUMMARY OF THE INVENTION

Problem to be Solved by the Invention

In a case of changing a target revolution speed of an engine to be lower as in the technique disclosed in Patent Document 1, generally, an actual revolution speed of the engine is reduced by exercising control such that injection of fuel to the engine is temporarily stopped to make the actual revolution speed closer to the target revolution speed. Subsequently, when the actual engine revolution speed becomes closer to the lower target engine revolution speed, the actual engine revolution speed is controlled to be maintained to the lower target engine revolution speed by restarting injection of fuel to the engine and regulating the fuel injection amount.

In the case of stopping injection of fuel to the engine and then restarting fuel injection in a short period of time in this way, problems occur that an output torque of the engine greatly fluctuates and noise is generated.

Furthermore, in the case of changing setting of the target engine revolution speed to be lower by operating the engine revolution speed instructing device while a load of the engine is in an unloaded state, the same problems possibly occur as the case of automatically reducing the target engine revolution speed while the work machine is not in operation. In other words, at a time of reducing the actual engine revolution speed to the lower target engine revolution speed changed by the engine revolution speed instructing device, the fuel injection amount may be controlled in such a manner as to restart the fuel injection in a short period of time after temporarily stopping injection of fuel to the engine. In a case of such control, a problem occurs that noise is generated due to a large fluctuation in the engine output torque.

The present invention has been achieved on the basis of the circumstances described above, and an object of the present invention is to provide a hybrid work machine that can suppress engine noise when a target revolution speed of the engine is changed to a lower revolution speed while an engine is in an unloaded state.

Means for Solving the Problems

While the present application includes a plurality of means for solving the problems described above, an example of the plurality of means is as follows. A hybrid work machine includes: an engine; a hydraulic pump driven by the engine; a hydraulic actuator driven by hydraulic fluid delivered from the hydraulic pump; a generator motor coupled to the engine, the generator motor being able to act both as a generator and a motor; an electric storage device that transmits and receives electric power to and from the generator motor; an engine controller that controls the engine on a basis of a target engine revolution speed; a power controller that controls action of the generator motor by controlling charge and discharge of the electric storage device; a controller that controls the engine controller and the power controller; and a target engine revolution speed change instructing device that give instructions on a change in the target engine revolution speed to be used in the engine controller on a basis of an operator's operation, the controller controlling the engine controller and the power controller to act the generator motor as the generator until an actual revolution speed of the engine is reduced to a revolution speed in response to a target engine revolution speed after change if the target engine revolution speed has been changed by an instruction of the target engine revolution speed change instructing device to be lower than a target engine revolution speed set before change while the engine is in an unloaded state.

Advantages of the Invention

According to the present invention, in the case where the target engine revolution speed has been changed to be lower than the target engine revolution speed set before change while the engine is in an unloaded state, an actual revolution speed of the engine is reduced while applying a load to the engine by acting the generator motor as a generator; thus, injection of fuel to the engine is not stopped at a time of speed reduction of the engine. Therefore, a large fluctuation in an engine output torque does not occur; thus, it is possible to suppress the noise of the engine when the target engine revolution speed is changed to a lower engine revolution speed while the engine is in an unloaded state.

BRIEF DESCRIPTION OF THE DRAWINGS

FIG. 9 is a flowchart depicting an example of control procedures by a machine body controller that configures part of the hybrid work machine according to Embodiment 2 of the present invention depicted in FIG. 8.

MODES FOR CARRYING OUT THE INVENTION

A hybrid work machine according to Embodiments of the present invention will be described hereinafter with reference to the drawings. In the present embodiments, a hydraulic excavator will be described as an example of the hybrid work machine.

Figure 1:
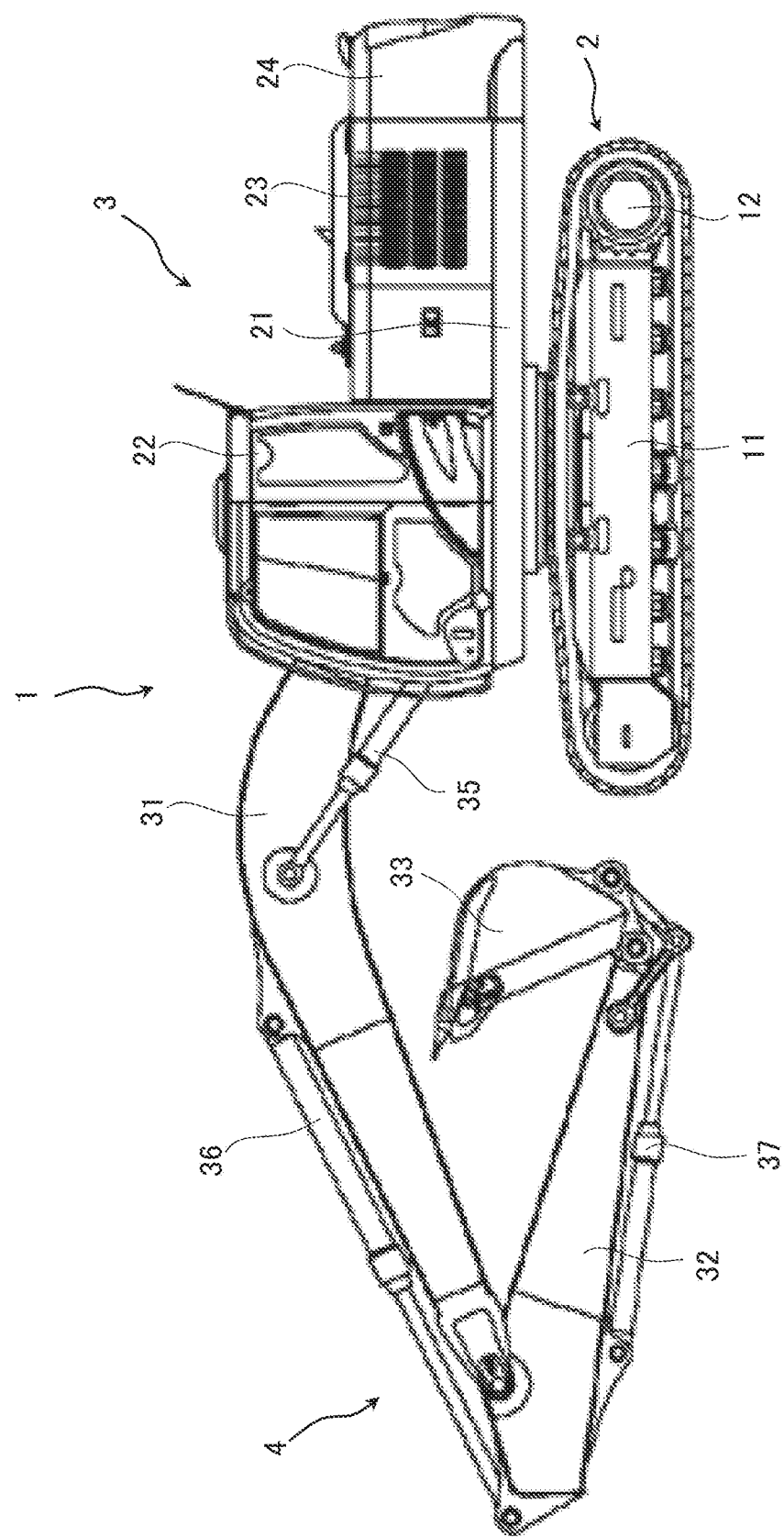
FIG. 1 is a side view depicting a hydraulic excavator to which a hybrid work machine according to Embodiment 1 of the present invention is applied.

First, a configuration of a hydraulic excavator to which the hybrid work machine according to Embodiment 1 of the present invention is applied will be described with reference to FIG. 1. FIG. 1 is a side view depicting the hydraulic excavator to which the hybrid work machine according to Embodiment 1 of the present invention is applied. It is noted that the hydraulic excavator will be described using directions in which an operator seated in a cab seat views the hydraulic excavator.

In FIG. 1, a hydraulic excavator 1 is configured with a self-propelled lower track structure 2, an upper swing structure 3 swingably mounted on the lower track structure 2, and a front work implement 4 provided in a laterally central portion of a front end portion of the upper swing structure 3 in such a manner as to be capable of being elevated.

The lower track structure 2 is configured with left and right crawler type track devices 11. Each of the left and right track devices 11 is driven by a track hydraulic motor 12 serving as a hydraulic actuator.

The upper swing structure 3 is driven to swing with respect to the lower track structure 2 by, for example, a swing hydraulic motor (not depicted) serving as a hydraulic actuator. The upper swing structure 3 is configured with a swing frame 21 that is a support structure, a cabin 22 installed on a left side of a front portion of the swing frame 21, a machine room 23 that is disposed on a rear side on the swing frame 21, and a counterweight 24 that is attached to a rear end portion of the swing frame 21. In the cabin 22, various devices for an operator to operate the hydraulic excavator 1 such as an engine control dial 71 (refer to FIG. 2) and operation devices 54 (refer to FIG. 2), a machine body controller 72 (refer to FIG. 2), and the like, to be described later, are disposed. In the machine room 23, various devices such as an engine 41 (refer to FIG. 2), a hydraulic pump 51 (refer to FIG. 2), a generator motor 61 (refer to FIG. 2), and an electric storage device 62 (refer to FIG. 2), to be described later, are accommodated. The counterweight 24 is used to balance the front work implement 4.

The front work implement 4 is an actuating device for performing excavation work and the like, and is configured with a boom 31, an arm 32, and a bucket 33. The boom 31 is rotatably coupled with a laterally central portion of a front end portion of the swing frame 21 of the upper swing structure 3. A base end portion of the arm 32 is rotatably coupled with a tip portion of the boom 31. A base end portion of the bucket 33 is rotatably coupled with a tip portion of the arm 32. The boom 31, the arm 32, and the bucket 33 are rotated by a boom cylinder 35, an arm cylinder 36, and a bucket cylinder 37, respectively. The boom cylinder 35, the arm cylinder 36, and the bucket cylinder 37 are hydraulic actuators that can extend and contract by supply of hydraulic operating fluid.

Figure 2:
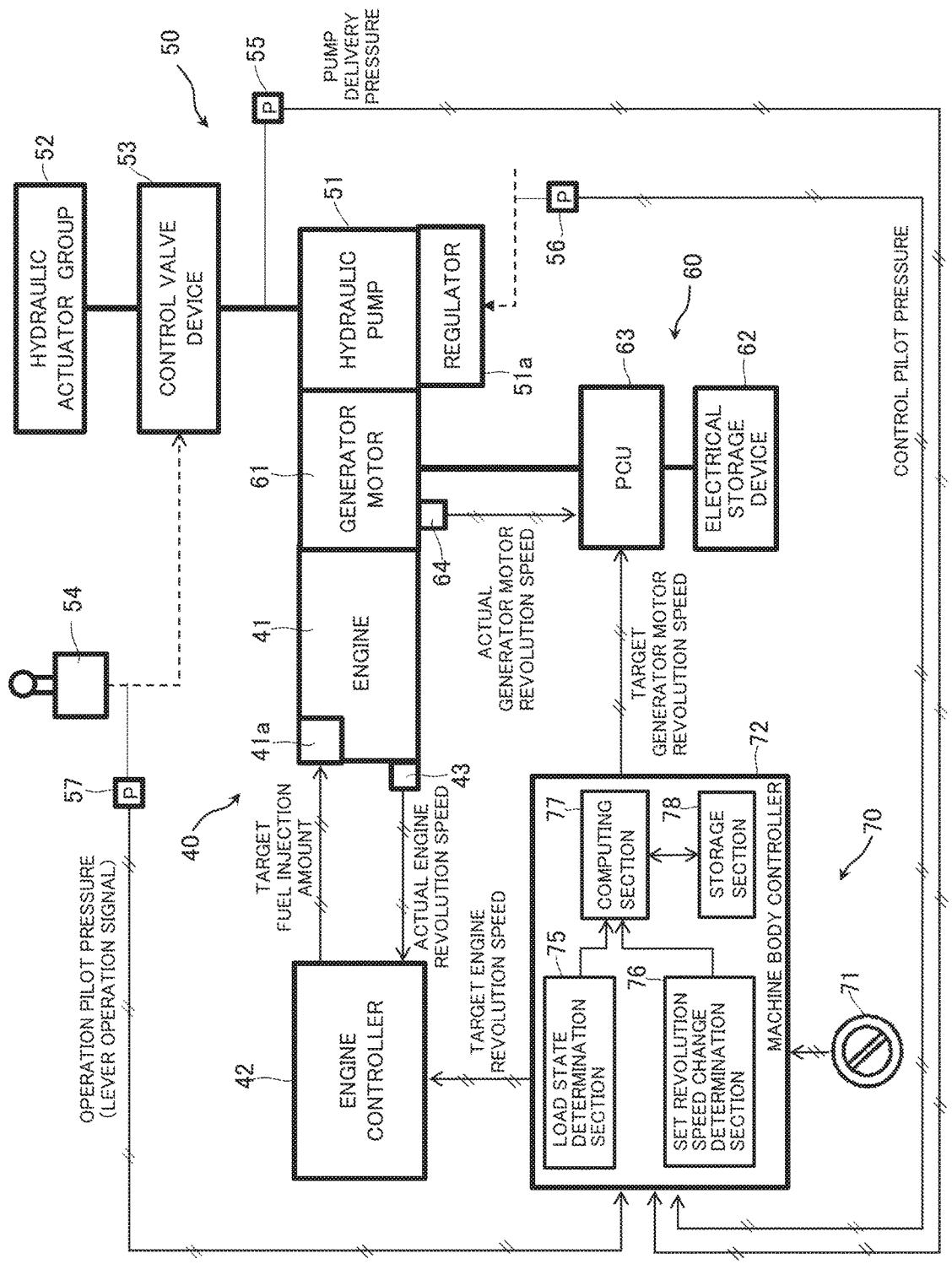
FIG. 2 is a schematic diagram depicting a configuration of a hybrid driving system in the hybrid work machine according to Embodiment 1 of the present invention depicted in FIG. 1.

A configuration of a hybrid driving system in the hybrid work machine according to Embodiment 1 of the present invention will next be described with reference to FIG. 2. FIG. 2 is a schematic diagram depicting the configuration of the hybrid driving system in the hybrid work machine according to Embodiment 1 of the present invention depicted in FIG. 1. In FIG. 2, constituent elements denoted by the same reference characters as those depicted in FIG. 1 are the same as those depicted in FIG. 1; thus, detailed description thereof will be omitted.

In FIG. 2, the hybrid driving system drives the lower track structure 2, the upper swing structure 3, the front work implement 4, and the like, and is configured with an engine system 40, a hydraulic system 50, a generator motor system 60, and a control system 70.

The engine system 40 is configured with an engine 41 and an engine controller 42 that controls an revolution speed and an output torque of the engine 41.

The engine 41 is configured by, for example, a diesel engine, and has a governor 41a that controls a fuel injection amount by which fuel is injected to each cylinder of the engine 41. The governor 41a controls fuel injection valves (not depicted) in such a manner that each fuel injection valve injects fuel by the fuel injection amount in response to a control signal from the engine controller 42. An engine revolution speed sensor 43 that detects an actual revolution speed of the engine 41 is provided in the engine 41. The engine revolution speed sensor 43 is configured by, for example, an angular speed sensor and outputs a detection signal about the actual engine revolution speed to the engine controller 42.

The engine controller 42 controls the engine 41 on the basis of a target engine revolution speed. Specifically, a command signal about the target engine revolution speed from the machine body controller 72, to be described later, and the detection signal about the actual engine revolution speed from the engine revolution speed sensor 43 are input to the engine controller 42, and the engine controller 42 performs a predetermined computing process on the basis of those signals and outputs the control signal that give instructions on a target fuel injection amount to the governor 41a. Details of control contents of the engine controller 42 will be described later.

The hydraulic system 50 is configured with the hydraulic pump 51 and a pilot pump, which is not depicted, that are driven by the engine 41, a hydraulic actuator group 52 driven by hydraulic fluid delivered from the hydraulic pump 51, a control valve device 53 that controls flows (flow rates and directions) of the hydraulic fluid supplied from the hydraulic pump 51 to the hydraulic actuator group 52, and the operation devices 54 (only one of which is depicted as a representative operation device 54) for operating the control valve device 53.

The hydraulic pump 51 is, for example, a variable displacement hydraulic pump, and is configured with a displacement varying mechanism (for example, swash plate) and a regulator 51a that regulates a tilting position of the displacement varying mechanism to control a capacity of the hydraulic pump 51. The regulator 51a regulates the tilting position of the displacement varying mechanism in response to a control pilot pressure guided from the pilot pump (not depicted). A first pressure sensor 55 that detects a delivery pressure of the hydraulic pump 51 is provided in a delivery line connected to a delivery side of the hydraulic pump 51. The first pressure sensor 55 outputs a detection signal about the delivery pressure of the hydraulic pump 51 to the machine body controller 72 to be described later. In addition, a second pressure sensor 56 that detects a control pilot pressure (flow control pressure) input to the regulator 51a is provided. The second pressure sensor 56 outputs a detection signal about the control pilot pressure input to the regulator 51a, to the machine body controller 72 to be described later.

The hydraulic actuator group 52 includes the boom cylinder 35, the arm cylinder 36, the bucket cylinder 37, and the left and right track hydraulic motors 12 depicted in FIG. 1, as well as the swing hydraulic motor (not depicted) and the like. The control valve device 53 incorporates therein a plurality of main spools corresponding to the plurality of hydraulic actuators 12, 35, 36, and 37 described above. These main spools are operated to be changed over by operation pilot pressures from the operation devices 54. A third pressure sensor 57 that detects the operation pilot pressures of the operation devices 54 is provided in the operation devices 54. The third pressure sensor 57 outputs detection signals (lever operation signals) about the operation pilot pressures of the operation devices 54 to the machine body controller 72 to be described later. In the present embodiment, the third pressure sensor 57 functions as an engine load state sensor that detects a state of a load applied to the engine 41. In a case where the lever operation signals detected by the third pressure sensor 57 are equal to or lower than a predetermined threshold, it is possible to determine that the plurality of actuators 12, 35, 36, and 37 are not operated and that the load of the engine 41 is in an unloaded state.

The generator motor system 60 is configured with the generator motor 61 coupled to the engine 41, the electric storage device 62 that transmits and receives electric power to and from the generator motor 61, and a power controller (hereinafter, referred to as "PCU (power control unit)") 63 that controls action of the generator motor 61 by controlling charge and discharge of the electric storage device 62.

The generator motor 61 can perform both generator action and motor action. In other words, the generator motor 61 can perform the generator operation for generating electric power by being driven to rotate by the engine 41, and the motor operation for supporting (assisting in) drive of the engine 41 and the hydraulic pump 51. The electric power generated by the generator motor 61 is stored in the electric storage device 62 via the PCU 63. On the other hand, at the time of supporting drive of the engine 41 and the hydraulic pump 51, the generator motor 61 works by supply of the electric power from the electric storage device 62 via the PCU 63. A generator motor revolution speed sensor 64 that detects an actual revolution speed of the generator motor 61 is provided in the generator motor 61. The generator motor revolution speed sensor 64 is configured by, for example, an angular speed sensor and outputs a detection signal about the actual generator motor revolution speed to the PCU 63.

The electric storage device 62 is configured with, for example, an electric double layer capacitor and is electrically connected to the generator motor 61 via the PCU 63. The electric storage device 62 charges the generated electric power of the generator motor 61 or discharges the charged electric power to the generator motor 61. As the electric storage device 62, for example, a battery or the like can be used instead of the capacitor.

The PCU 63 performs conversion from/into a direct-current into/from an alternating-current, step-down and step-up of direct-current electric power, and the like between the electric storage device 62 and the generator motor 61. Specifically, when the generator motor 61 generates electric power, the PCU 63 converts AC power from the generator motor 61 into DC power, then steps down the DC power, and supplies the resultant DC power to the electric storage device 62. On the other hand, in a case of driving the generator motor 61 as an electric motor, the PCU 63 steps up the DC power from the electric storage device 62, then converts the DC power into a AC power for drive, and supplies the resultant AC power to the generator motor 61.

Furthermore, the PCU 63 exercises revolving speed control to generate a torque of the generator motor 61 in such a manner that the actual revolution speed of the generator motor 61 matches the target generator motor revolution speed. Specifically, the command signal about the target generator motor revolution speed from the machine body controller 72 to be described later and the detection signal about the actual generator motor revolution speed from the generator motor revolution speed sensor 64 are input to the PCU 63, and the PCU 63 computes the torque of the generator motor 61 by a predetermined computing process. The PCU 63 controls the charge and discharge of the electric storage device 62 on the basis of this computing result to control the revolution speed of the generator motor 61. It is noted that the PCU 63 may control an output torque of the generator motor 61 in such a manner that the output torque of the generator motor 61 is equal to a target torque. In this case, the PCU 63 controls the output torque by controlling a command current to an inverter (not depicted) driving the generator motor 61.

The control system 70 is configured with the engine control dial (hereinafter, referred to as "EC dial") 71 serving as an engine revolution speed instructing device that give instructions on a set revolution speed of the engine 41 in response to an operator's operation, and the machine body controller 72 serving as a controller that exercises overall control over the hydraulic excavator 1.

The EC dial 71 is configured by, for example, an operation dial operated by an operator. The EC dial 71 outputs to the machine body controller 72 an instruction signal about a set revolution speed in response to the operator's operation. It is noted that the EC dial 71 may be configured by an up-down switch, an engine lever, or the like.

The machine body controller 72 is electrically connected to the engine controller 42 and the PCU 63, controls the output torque and the revolution speed of the engine 41 via the engine controller 42, and controls the torque (absorption torque or assist torque) and the revolution speed of the generator motor 61 via the PCU 63. In addition, the machine body controller 72 controls a delivery capacity of the hydraulic pump 51. In the present embodiment, the machine body controller 72 performs a predetermined comparison determination and a predetermined computing process on the basis of the instruction signal from the EC dial 71 and the detection signal from the third pressure sensor, outputs the command signal giving instructions on the target engine revolution speed to the engine controller 42 to control the engine controller 42, and outputs the command signal giving instructions on the target generator motor revolution speed to the PCU 63 to control the PCU 63.

The machine body controller 72 according to the present embodiment is configured with, as functional blocks, a load state determination section 75 that determines whether the load of the engine 41 is in an unloaded state, a set revolution speed change determination section 76 that determines whether the set revolution speed instructed by the EC dial 71 has been changed to be lower than a set revolution speed before change, a computing section 77 that computes the target engine revolution speed and the target generator motor revolution speed, and a storage section 78 that stores various thresholds and various characteristic diagrams in advance.

The load state determination section 75 determines whether the load of the engine 41 is in an unloaded state by, for example, comparing the detection signal from the third pressure sensor 57 with a predetermined threshold stored in the storage section 78 in advance. When the detection signal from the third pressure sensor 57 is equal to or lower than the threshold, the load state determination section 75 determines that the plurality of hydraulic actuators 12, 35, 36, and 37 are not operated and, therefore, that the load of the engine 41 is in an unloaded state. On the other hand, when the detection signal from the third pressure sensor 57 is higher than the threshold, the load state determination section 75 determines that at least one of the plurality of hydraulic actuators 12, 35, 36, and 37 is operated and, therefore, that the engine 41 is in a loaded state.

The set revolution speed change determination section 76 determines whether the set revolution speed instructed by the EC dial 71 has been changed to be lower by a positive or negative sign of a difference between the current instruction signal from the EC dial 71 and a previous instruction signal. When the difference between the current instruction signal from the EC dial 71 and the previous instruction signal is a negative value equal to or greater than a predetermined value, the set revolution speed change determination section 76 determines that the set revolution speed instructed by the EC dial 71 has been changed to be lower.

The computing section 77 basically computes the target engine revolution speed on the basis of the set revolution speed instructed by the EC dial 71. In addition, the computing section 77 computes the target generator motor revolution speed as needed. When the load state determination section 75 determines that the load of the engine 41 is in an unloaded state and the set revolution speed change determination section 76 determines that the set revolution speed instructed by the EC dial 71 has been changed to be lower than the set revolution speed before change, the computing section 77 computes the target engine revolution speed and the target generator motor revolution speed in such a manner as to prevent a large fluctuation in the output torque of the engine 41 at a time of speed reduction of the engine 41. A specific computing process in this case will be described later.

In the present embodiment, the EC dial 71 configures the target engine revolution speed change instructing device that gives instructions on a change in the target engine revolution speed to be used in the engine controller 42 on the basis of the operator's operation. The case where the target engine revolution speed is changed by the instruction of the target engine revolution speed change instructing device to be lower than the target engine revolution speed set before change is a case where the set revolution speed instructed by the EC dial 71 by the operator's operation is changed to be lower than the set revolution speed before change and the machine body controller 72 computes the target engine revolution speed on the basis of the changed set revolution speed.

Next, contents of control executed by the engine controller and the computing section of the machine body controller that configure the hybrid work machine according to Embodiment 1 of the present invention will be described with reference to FIGS. 3 to 5.

First, the contents of control of the engine controller will be described with reference to FIGS. 2 to 4. FIG. 3 is a characteristic diagram depicting the engine output torque relative to the engine revolution speed in a case where the engine controller that configures part of the hybrid work machine according to Embodiment 1 of the present invention controls the engine on the basis of a droop characteristic, and FIG. 4 is a characteristic diagram depicting a fuel injection amount characteristic in a case where the engine controller that configures part of the hybrid work machine according to Embodiment 1 of the present invention controls the engine on the basis of the droop characteristic. In FIG. 3, a horizontal axis NE indicates the engine revolution speed and a vertical axis TE indicates the engine output torque. A thick line Tf indicates a maximum torque characteristic in engine specifications, and a thin line Trx indicates a regulation characteristic at the target engine revolution speed of NEtx. In FIG. 4, a horizontal axis $\Delta$NE indicates a revolution speed deviation between the target engine revolution speed input from the machine body controller and the actual engine revolution speed detected by the engine revolution speed sensor, and a vertical axis F indicates a fuel injection amount by which fuel is injected to the engine.

At least, when the machine body controller 72 determines that the load of the engine 41 is in an unloaded state and that the set revolution speed instructed by the EC dial 71 has been changed to be lower than the set revolution speed before change, the engine controller 42 depicted in FIG. 2 controls the engine 41 in accordance with the droop characteristic in such a manner that the fuel injection amount is increased while the engine revolution speed is reduced at a predetermined rate (inclination) in proportion to an increase in the load applied to the engine 41, and that the fuel injection amount is reduced while the engine revolution speed is increased at the predetermined rate (inclination) in proportion to a reduction in the load applied to the engine 41. In other words, the engine controller 42 controls the engine 41 on the basis of a regulation characteristic having the droop characteristic that the output torque of the engine 41 is increased at the predetermined rate (inclination) in proportion to a reduction in the revolution speed of the engine 41. The regulation characteristic is set per target engine revolution speed.

Figure 3:
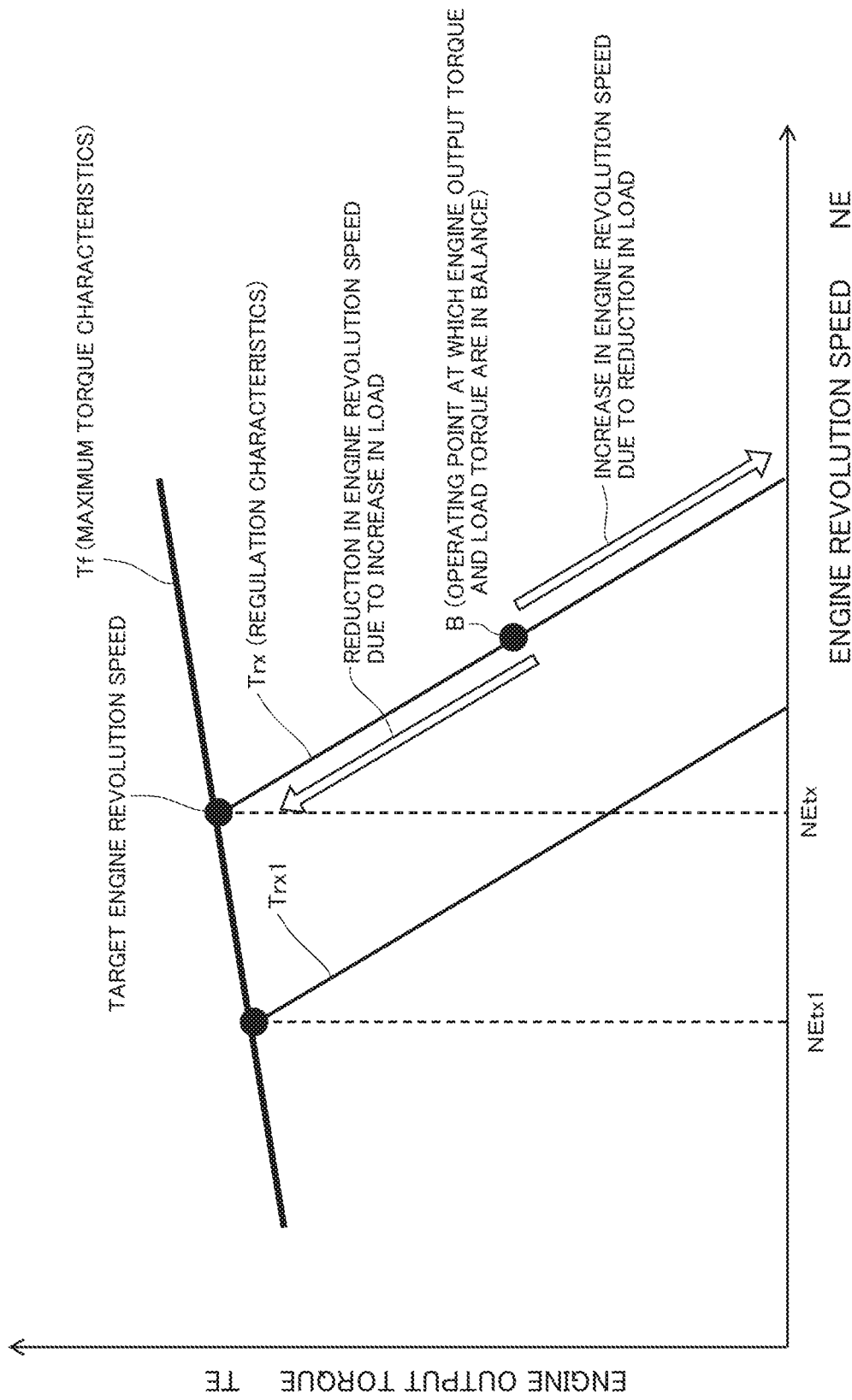
FIG. 3 is a characteristic diagram depicting an engine output torque relative to an engine revolution speed in a case where an engine controller that configures part of the hybrid work machine according to Embodiment 1 of the present invention controls an engine on the basis of a droop characteristic.

Specifically, when the target engine revolution speed from the machine body controller 72 is, for example, set to NEtx, the engine controller 42 controls the governor 41$a$ (refer to FIG. 2) in such a manner that an operating point of the engine 41 moves on the regulation characteristic Trx passing through an intersecting point between the maximum torque characteristic Tf and the target engine revolution speed NEtx and having a predetermined inclination (downward-sloping inclination) as depicted in FIG. 3. In other words, the engine controller 42 increases the fuel injection amount to increase the engine output torque TE when a load torque applied to the engine 41 increases and the engine revolution speed NE is reduced from an operating point B of the engine 41 at which the engine output torque TE and the load torque are in balance. On the other hand, the engine controller 42 reduces the fuel injection amount to reduce the engine output torque TE when the load torque decreases and the engine revolution speed NE is increased. While the target engine revolution speed is defined herein as the engine revolution speed on the maximum torque characteristic Tf of the engine 41, the target engine revolution speed can be defined as an engine revolution speed in a case where a load is not applied to the engine 41.

When the target engine revolution speed is set to NEtx1 which is lower than NEtx, the regulation characteristic changes to a characteristic Tr1 passing through an intersecting point between the maximum torque characteristic Tf and the target engine revolution speed NEtx1 and having a downward-sloping inclination. In other words, whenever the target engine revolution speed is reduced, the regulation characteristic is set to move leftward in the characteristic diagram depicted in FIG. 3.

Figure 4:
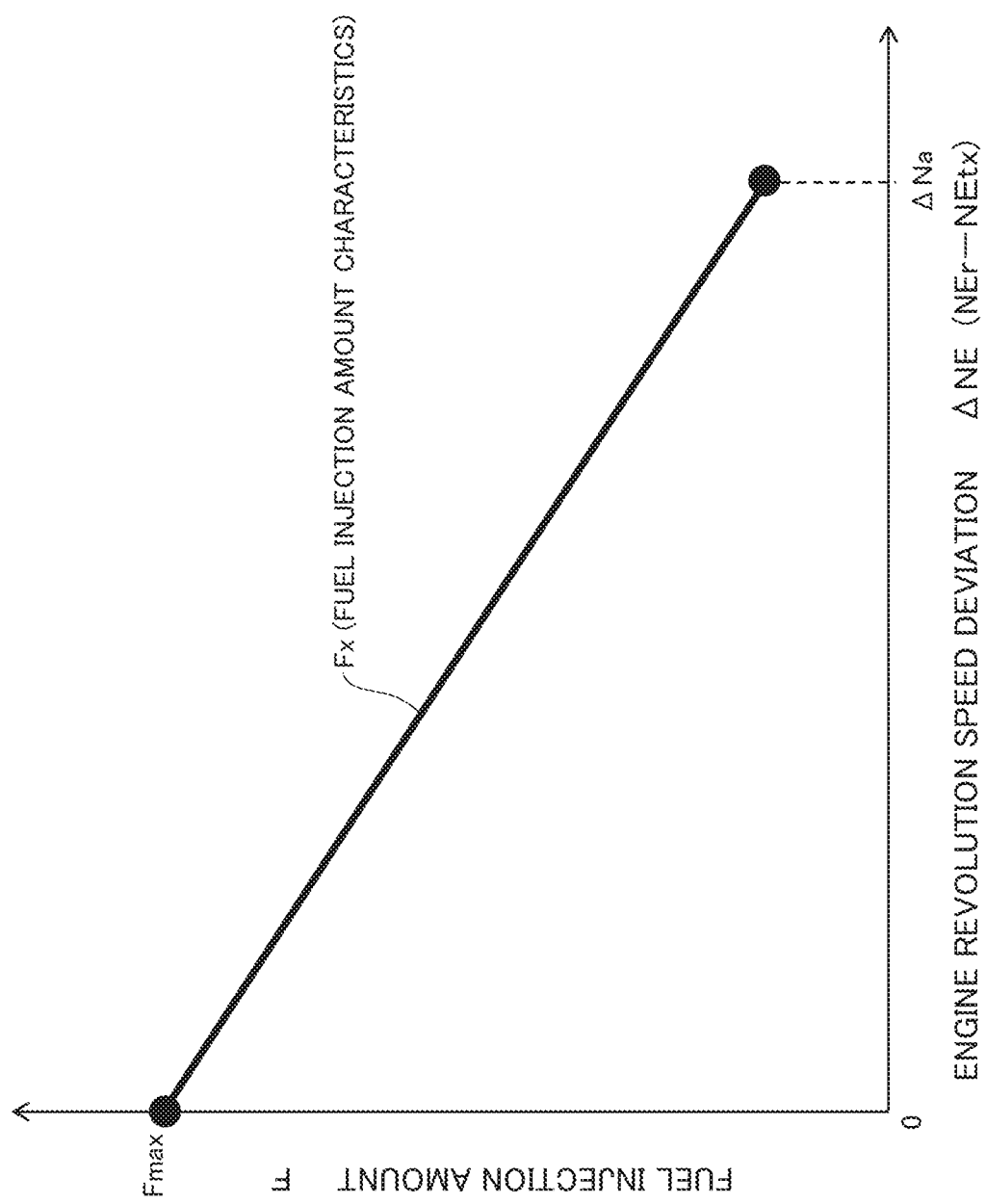
FIG. 4 is a characteristic diagram depicting a fuel injection amount characteristic in the case where the engine controller that configures part of the hybrid work machine according to Embodiment 1 of the present invention controls the engine on the basis of the droop characteristic.

To enable control based on the regulation characteristic described above, the engine controller 42 uses, for example, the fuel injection amount characteristic depicted in FIG. 4. This fuel injection amount characteristic is set such that the fuel injection amount F is reduced directly proportionally along a characteristic Fx that is a downward-sloping straight line in proportion to an increase in an engine revolution speed deviation ΔNE between the target engine revolution speed NEtx from the machine body controller 72 and an actual engine revolution speed NEr of the engine 41 detected by the engine revolution speed sensor 43. The fuel injection amount F becomes a maximum fuel injection amount Fmax when the engine revolution speed deviation ΔNE is zero, and the fuel injection amount F becomes a minimum fuel injection amount Fmin when the engine revolution speed deviation ΔNE reaches a predetermined value ΔNa.

Under the control based on the regulation characteristic described above, a fuel injection amount characteristic corresponding to each target engine revolution speed is stored in advance. When the target engine revolution speed is input to the engine controller 42 from the machine body controller 72, the engine controller 42 selects a fuel injection amount characteristic in response to the target engine revolution speed. The engine controller 42 refers to the selected fuel injection amount characteristic, obtains a fuel injection amount corresponding to a computed engine revolution speed deviation ΔN, and outputs the fuel injection amount that is a computing result to the governor 41$a$ as a target value. The governor 41$a$ controls the fuel injection amount by which fuel is injected to the engine 41 on the basis of the control signal about the fuel injection amount from the engine controller 42.

It is noted that in a case of normal control other than the control described above, the engine 41 may be controlled either on the basis of the regulation characteristic having the droop characteristic based on the target engine revolution speed from the machine body controller 72, or on the basis of a regulation characteristic having an isochronous characteristic for regulating the fuel injection amount in such a manner as to keep the engine revolution speed constant regardless of any increase or decrease of the load applied to the engine. Alternatively, the engine 41 may be controlled on the basis of a regulation characteristic having other characteristics.

Next, a computing process for computing the target engine revolution speed and the target generator motor revolution speed by the computing section of the machine body controller will be described with reference to FIG. 5. FIG. 5 is an explanatory diagram depicting the computing process for computing the target engine revolution speed and the target generator motor revolution speed by the computing section of the machine body controller that configures part of the hybrid work machine according to Embodiment 1 of the present invention. In FIG. 5, a horizontal axis NE indicates the engine revolution speed and a vertical axis TE indicates the engine output torque.

If determining that the engine 41 is in a loaded state, the machine body controller 72 computes the target engine revolution speed in accordance with a machine body condition (for example, temperature) on the basis of a set revolution speed NEs instructed by the EC dial 71, and outputs the computing result of the target engine revolution speed to the engine controller 42.

On the other hand, if determining that the load of the engine 41 is in an unloaded state and that the set revolution speed instructed by the EC dial 71 has been changed to be lower than the set revolution speed before change, the machine body controller 72 performs a process for computing the target engine revolution speed and the target generator motor revolution speed in the following procedures to reduce the actual revolution speed of the engine 41 to a revolution speed in response to the set revolution speed changed to be lower. This computing process is basically performed to reduce the actual revolution speed of the engine 41 to the set revolution speed after change instructed by the EC dial 71, more precisely, a revolution speed corresponding to the target engine revolution speed computed in accordance with the machine body condition on the basis of the set revolution speed NEsl newly instructed by the EC dial 71 while applying a load to the engine 41 by acting the generator motor 61 as the generator by revolution speed control of the generator motor 61, and is intended to obtain the target generator motor revolution speed for controlling the generator motor 61 using the same regulation characteristic as the regulation characteristic Tr of the engine controller 42.

Since the revolution speed of the generator motor 61 is controlled to match the target generator motor revolution speed, the engine 41 is driven at the same target generator motor revolution speed as that of the generator motor 61. In a case of being controlled to operate on the regulation characteristic having the droop characteristic, the engine 41 outputs an engine torque corresponding to the target generator motor revolution speed (revolution speed at which the engine is driven) on the regulation characteristic. Therefore, as a torque characteristic applied to the engine at a time of speed reduction of the engine 41, a target load torque characteristic for preventing a large torque fluctuation, that is, a torque characteristic obtained by incrementing a drag torque, to be described later, by ΔT is specified, and an engine revolution speed corresponding to the target load torque characteristic on each regulation characteristic is set as the target generator motor revolution speed. By setting the target generator motor revolution speed in this way, the engine 41 outputs an engine torque that matches the target load torque characteristic while being driven at the same revolution speed (target generator motor revolution speed) as that of the generator motor 61.

In other words, when the target engine revolution speed has been changed by the instruction of the EC dial 71 serving as the target engine revolution speed change instructing device to be lower than the target engine revolution speed set before change while the engine 41 is in an unloaded state, the machine body controller 72 according to the present embodiment controls the engine controller 42 and the power controller 63 to reduce the revolution speed of the engine 41 in such a manner that the generator motor 61 acts as the generator and the operating point of the engine 41 moves on the torque characteristic (target load torque characteristic) obtained by incrementing the drag torque characteristic by a predetermined amount.

Specifically, a regulation characteristic having the same droop characteristic as that of the regulation characteristic (refer to FIG. 3) of the engine controller 42 for each target engine revolution speed is stored in advance in the storage section 78 (refer to FIG. 2) of the machine body controller 72.

Figure 5:
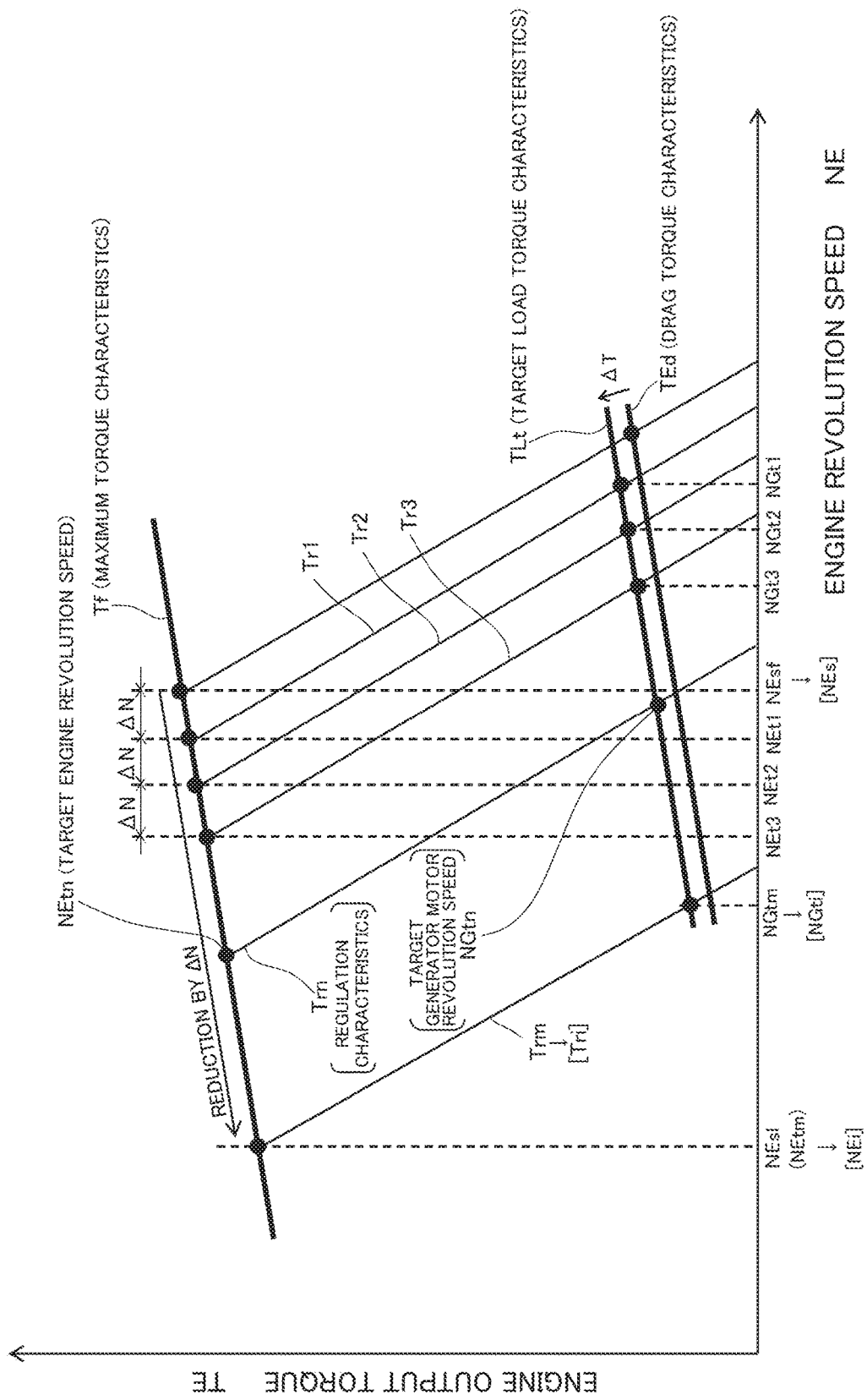
FIG. 5 is an explanatory diagram depicting a computing process for computing a target engine revolution speed and a target generator motor revolution speed by a computing section of a machine body controller that configures part of the hybrid work machine according to Embodiment 1 of the present invention.

As depicted in FIG. 5, the computing section 77 successively computes the target engine revolution speed in such a manner as to reduce the target engine revolution speed step by step from a set revolution speed NEsf before change instructed by the EC dial 71 to the set revolution speed NEsl after change. For example, the computing section 77 computes a target engine revolution speed NEtn by the following Equation (1). In Equation (1), $\Delta N$ indicates a value obtained by dividing a difference between the set revolution speed NEsf before change and the set revolution speed NEsl after change by m. In addition, n indicates a natural number from 1 to m. The computing section 77 is configured to increase n by 1 per computing and to end computing when n reaches m.

$$NEtn=NEsf-\Delta N \times n \quad (1)$$

In other words, target engine revolution speeds NEt1, NEt2, NEt3, . . . NEtm (NEsl) are numeric values each obtained by reducing the set revolution speed NEsf before change by $\Delta N$.

Furthermore, the computing section 77 sets a regulation characteristic Trn for each of the successively computed target engine revolution speeds NEtn from the regulation characteristic stored in the storage section 78 in advance. The computing section 77 obtains an intersecting point between the set regulation characteristic Trn and a preset target load torque characteristic TLt. The computing section 77 computes a revolution speed at this intersecting point as a target generator motor revolution speed NGtn. As the target load torque characteristic TLt, the computing section 77 specifies, for example, a torque characteristic obtained by incrementing a drag torque characteristic TEd that is a torque characteristic obtained from a test or the like while the engine 41 is in an unloaded state (engine output torque characteristic when the hydraulic actuators 12, 35, 36, and 37 are not actuated and the engine 41 is in an idling state) by $\Delta T$. It is noted that the drag torque while the engine 41 is in an unloaded state depends on the actual engine revolution speed and becomes lower as the engine revolution speed becomes lower.

When the target engine revolution speed NEtn is reduced to, for example, NEt1, NEt2, NEt3, . . . , or NEtm (NEsl) by $\Delta N$, the regulation characteristic is set to shift accordingly leftward to Tr1, Tr2, Tr3, . . . , or Trm, respectively, as depicted in FIG. 5. The computing section 77 obtains the target generator motor revolution speed NGtn from the intersecting point between the regulation characteristic Tr1, Tr2, Tr3, . . . , or Trm and the target load torque characteristic TLt in such a manner that the target generator motor revolution speed NGtn is reduced to NGt1, NGt2, NGt3, . . . , or NGtm step by step.

The machine body controller 72 outputs the target engine revolution speed NEtn and the target generator motor revolution speed NGtn computed by the computing section 77 to the engine controller 42 and the PCU 63, respectively, for each computing. In other words, the machine body controller 72 successively outputs NEt1, NEt2, NEt3, . . . , and NEtm to the engine controller 42 one by one as the target engine revolution speed, and successively outputs NGt1, NGt2, NGt3, . . . , and NGtm corresponding to NEt1, NEt2, NEt3, . . . , and NEtm to the PCU 63 one by one as the target generator motor revolution speed, per computing period. The engine controller 42 controls the revolution speed and the torque of the engine 41 on the basis of the target engine revolution speed NEt1, NEt2, NEt3, . . . , or NEtm output from the machine body controller 72 per computing period, and the PCU 63 controls the revolution speed and the torque of the generator motor 61 on the basis of the target generator motor revolution speed NGt1, NGt2, NGt3, . . . , or NGtm output from the machine body controller 72 per computing period.

Figure 6:
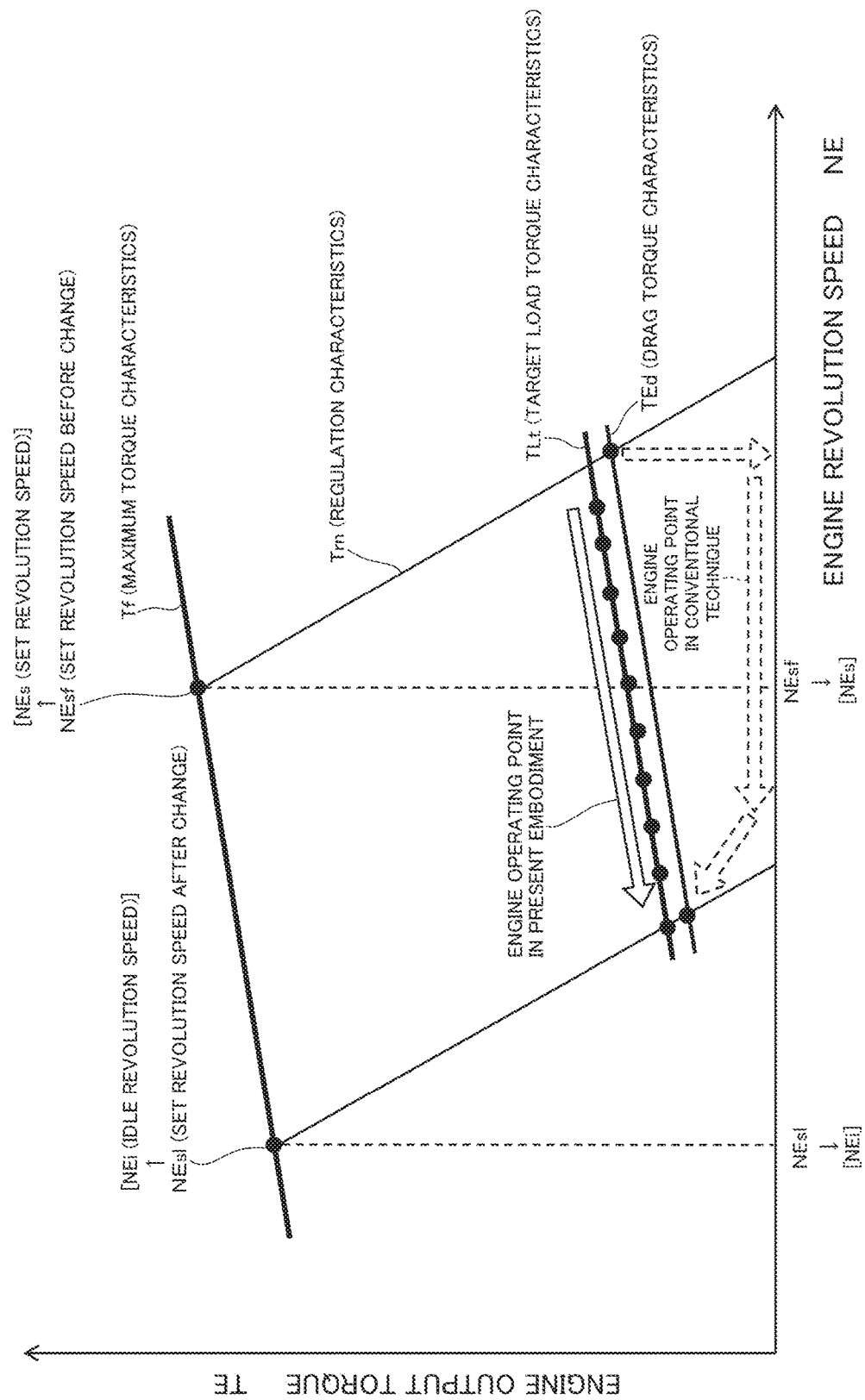
FIG. 6 is an explanatory diagram depicting movements of engine operating points in a case where a set revolution speed of the engine has been changed to be lower in the hybrid work machine according to Embodiment 1 of the present invention and a conventional technique.
Figure 7:
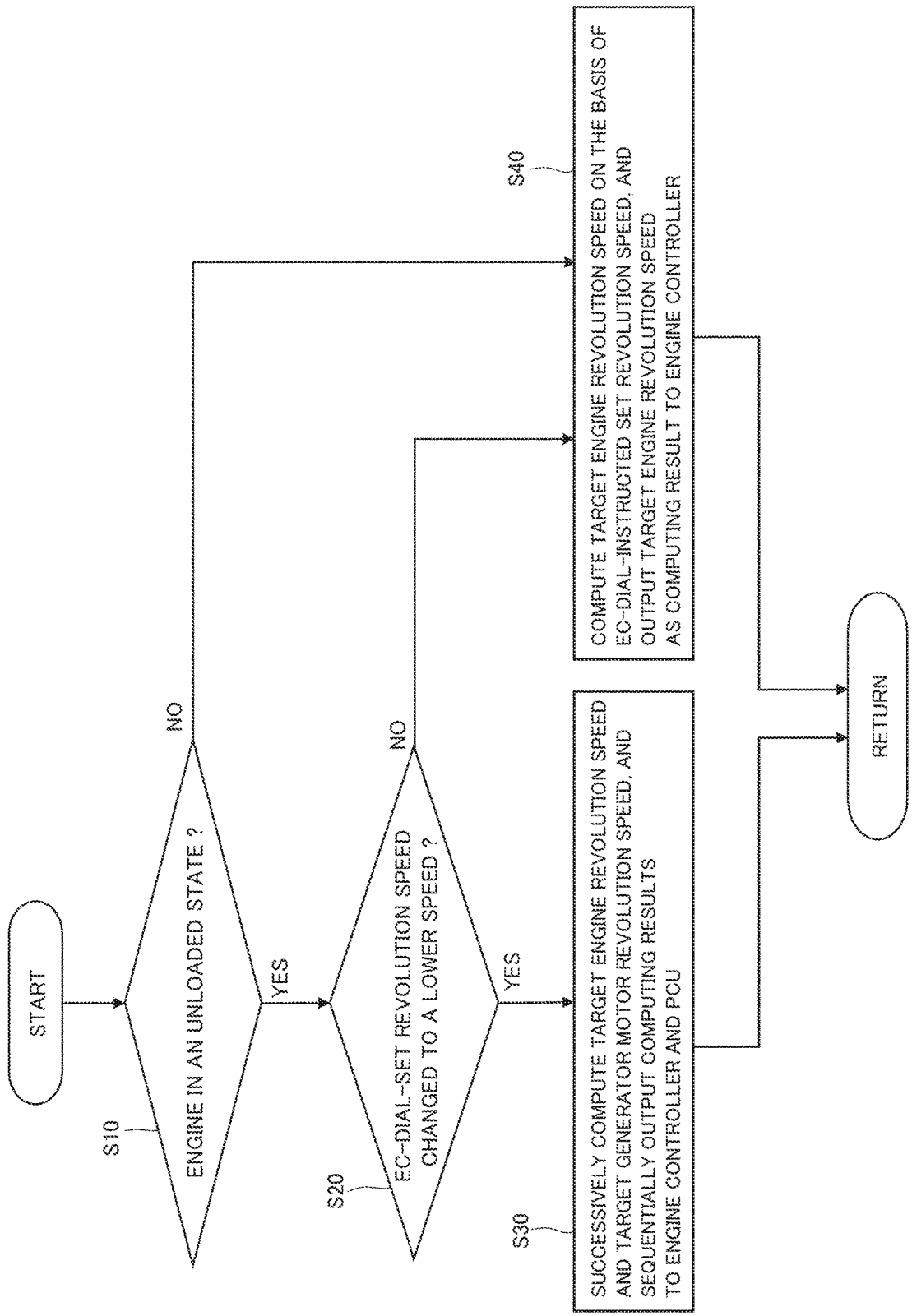
FIG. 7 is a flowchart depicting an example of control procedures by the machine body controller that configures part of the hybrid work machine according to Embodiment 1 of the present invention.

Next, operations of the hybrid work machine according to Embodiment 1 of the present invention will be described with reference to FIGS. 2, 5, 6, and 7 while being compared with those of the conventional technique. FIG. 6 is an explanatory diagram depicting movements of engine operating points in a case where the set revolution speed has been changed to be lower in the hybrid work machine according to Embodiment 1 of the present invention and in the conventional technique, and FIG. 7 is a flowchart depicting an example of control procedures by the machine body controller that configures part of the hybrid work machine according to Embodiment 1 of the present invention. In FIG. 6, a horizontal axis NE indicates the engine revolution speed and a vertical axis TE indicates the engine output torque.

In a case where the set revolution speed instructed by the EC dial 71 by an operator's operation has been changed to be lower than the set revolution speed before change while the load of the engine 41 is in an unloaded state, the work machine exercises control such that the actual revolution speed of the engine 41 is reduced to the revolution speed corresponding to the changed lower set revolution speed.

In a work machine according to the conventional technique, the actual revolution speed of the engine is reduced from a revolution speed corresponding to the set revolution speed NEsf before change (revolution speed in the unloaded state of the engine on the regulation characteristic Tr) by temporarily stopping injection of fuel to the engine to reduce the output torque of the engine to zero, and thus the operating point of the engine moves as indicated by a broken-line open arrow depicted in FIG. 6. Subsequently, when the actual revolution speed of the engine becomes closer to the lower set revolution speed NEsl after change, then the fuel injection is restarted to output the engine torque, and the fuel injection amount is controlled, thereby maintaining the engine revolution speed to a revolution speed corresponding to the lower set revolution speed NEsl after change (revolution speed in the unloaded state of the engine on the regulation characteristic Tr). Since the output torque of the engine largely fluctuates in this control, noise is generated.

The present embodiment, by contrast, suppresses the fluctuation in the engine output torque at times of reducing the actual revolution speed of the engine 41 by the following control procedures.

In FIG. 7, the machine body controller 72 depicted in FIG. 2 first determines whether the load of the engine 41 is in an unloaded state (Step S10). Specifically, if the operation pilot pressures detected by the third pressure sensor 57 are equal to or lower than the predetermined threshold, the machine body controller 72 determines that the load of the engine 41 is in an unloaded state (YES). Otherwise, the machine body controller 72 determines that the engine 41 is in a loaded state (NO).

If determining in Step S10 that the engine 41 is in an loaded state (NO), the machine body controller 72 goes to Step S40. In Step S40, the machine body controller 72 computes the target engine revolution speed in accordance with the machine body condition on the basis of the set revolution speed NEs instructed by the EC dial 71, and outputs the computing result to the engine controller 42. The engine controller 42 thereby controls the revolution speed and the torque of the engine 41 in accordance with the regulation characteristic having a droop characteristic, isochronous characteristic, or other characteristics on the basis of the target engine revolution speed computed using the set revolution speed NEs.

It is noted that, in Step S40, the machine body controller 72 computes the target generator motor revolution speed as needed and outputs the computing result to the PCU 63. The PCU 63 actuates the generator motor 61 as the generator or the motor in such a manner that the actual revolution speed of the generator motor 61 matches the target generator motor revolution speed on the basis of the target generator motor revolution speed from the machine body controller 72 and the actual generator motor revolution speed from the generator motor revolution speed sensor 64.

On the other hand, if determining in Step S10 that the load of the engine 41 is in an unloaded state (YES), the machine body controller 72 goes to Step S20. In Step S20, the machine body controller 72 determines whether the set revolution speed instructed by the EC dial 71 has been changed to be lower than the set revolution speed before change. Specifically, the determination is based on the positive or negative sign of the difference between the current instruction signal from the EC dial 71 and the previous instruction signal. If the difference between the instruction signals is negative and equal to or smaller than the predetermined value, the machine body controller 72 determines that the set revolution speed instructed by the EC dial 71 has been changed to be lower (YES). Otherwise, the machine body controller 72 determines NO.

If determining NO in Step S20, the machine body controller 72 goes to Step S40, in which the machine body controller 72 performs the computing described above and outputs the computing results to the engine controller 42 and the PCU 63.

On the other hand, if determining in Step S20 that the set revolution speed instructed by the EC dial 71 has been changed to be lower (YES), the machine body controller 72 goes to Step S30. In Step S30, the machine body controller 72 successively computes the target engine revolution speed NEtn in such a manner as to reduce the target engine revolution speed step by step from the set revolution speed NEsf before change instructed by the EC dial 71 to the set revolution speed NEsl after change, as depicted in FIG. 5. In addition, as depicted in FIG. 5, the machine body controller 72 successively computes the target generator motor revolution speed NGtn by referring to the same regulation characteristic as the regulation characteristic Trn of the engine controller 42 set on the basis of the computed target engine revolution speed NEtn and to the preset target load torque characteristic TLt. The successively computed target generator motor revolution speed NGtn is reduced step by step in response to the target engine revolution speed NEtn that is reduced step by step. The machine body controller 72 outputs the target engine revolution speed NEtn and the target generator motor revolution speed NGtn that are the computing results to the engine controller 42 and the PCU 63, respectively, for each computing.

The PCU 63 exercises revolution speed control over the generator motor 61 in such a manner that the actual revolution speed of the generator motor 61 matches the target generator motor revolution speed NGtn from the machine body controller 72. As a result, the engine 41 is driven in such a manner that its actual revolution speed becomes substantially equal to the target generator motor revolution speed NGtn. At this time, the engine controller 42 controls the engine 41 on the basis of the regulation characteristic Trn having the droop characteristic that is uniquely determined by the target engine revolution speed NEtn computed by the machine body controller 72. Therefore, the engine 41 outputs the engine torque in response to the target generator motor revolution speed NGtn on the regulation characteristic Trn. As depicted in FIG. 5, the target generator motor revolution speed NGtn is obtained from the intersecting point between the same regulation characteristic as the regulation characteristic Trn of the engine controller 42 set per target engine revolution speed NEtn and the target load torque characteristic TLt (torque characteristic obtained by incrementing the drag torque characteristic TEd by ΔT). Therefore, in the engine control using the same regulation characteristic, the engine 41 driven at the same revolution speed as the target generator motor revolution speed NGtn outputs a torque obtained by incrementing the drag torque in the unloaded state of the engine 41 by ΔT. This increment ΔT corresponds to the torque of the generator motor 61. In other words, in the present embodiment, the machine body controller 72 controls the engine 41 and the generator motor 61 in such a manner that the generator motor 61 is acted as a generator and a power generation torque (load) is applied to the engine 41.

When the operating point of the engine 41 under control of the engine controller 42 and the PCU 63 on the basis of the target engine revolution speed NEtn and the target generator motor revolution speed NGtn for each computing is plotted, the operating point moves on the target load torque characteristic TEd as indicated by the open arrow depicted in FIG. 6. In other words, the actual revolution speed of the engine 41 is reduced while actuating the generator motor 61 as the generator and applying a load to the engine 41; thus, a large fluctuation in the engine output torque does not occur at the time of speed reduction of the engine 41.

As described above, according to the hybrid work machine according to Embodiment 1 of the present invention, when the set revolution speed instructed by the EC dial 71 has been changed to be lower than the set revolution speed before change while the engine 41 is in an unloaded state, the actual revolution speed of the engine 41 is reduced while applying a load to the engine 41 by acting the generator motor 61 as the generator; thus, injection of fuel to the engine 41 is not stopped at the time of speed reduction of the engine 41. Therefore, a large fluctuation in the engine output torque does not occur; thus, it is possible to suppress the noise of the engine 41 in the case where the target engine revolution speed of the engine 41 has been changed to be lower while the engine 41 is in an unloaded state.

Furthermore, according to the present embodiment, the machine body controller 72 is configured to successively compute the target engine revolution speed in such a manner that the target engine revolution speed is reduced, step by step, from the set revolution speed before change instructed by the EC dial 71 to the set revolution speed after change, to output the computed target engine revolution speed to the engine controller 42, to successively set the same regulation characteristic as the regulation characteristic Trn of the engine controller 42 on the basis of the successively computed target engine revolution speed, and to output to the PCU 63 as the target generator motor revolution speed of the generator motor 61 the revolution speed at the intersecting point between the regulation characteristic Trn and the preset target load torque characteristic TLt at the time of speed reduction of the engine 41; thus, it is possible to reduce the actual revolution speed of the engine 41 to the set revolution speed after change instructed by the EC dial 71 without causing large fluctuations in the engine output torque.

Moreover, according to the present embodiment, the machine body controller 72 is configured to control the engine controller 42 and the power controller 63 to reduce the revolution speed of the engine 41 in such a manner that the operating point of the engine 41 moves on the torque characteristic obtained by incrementing the drag torque characteristic that is the torque characteristic in the unloaded state of the engine by the predetermined amount if the target engine revolution speed has been changed by the instruction of the EC dial 71 serving as the target engine revolution speed change instructing device to be lower than the target engine revolution speed set before change while the engine 41 is in an unloaded state; thus, it is possible to suppress the fuel injection amount by which fuel is injected to the engine 41 at the time of speed reduction of the engine 41.

Furthermore, according to the present embodiment, the torque characteristic obtained by incrementing the drag torque characteristic TEd that is the torque characteristic in the unloaded state of the engine 41 by the predetermined amount is adopted as the target load torque characteristic TLt used in computing the target generator motor revolution speed; thus, it is possible to control the operating point at the time of speed reduction of the engine 41 in such a manner that the operating point moves in the vicinity of the drag torque characteristic TEd. Therefore, it is possible to apply the power generation torque of the generator motor 61 to the engine 41 while suppressing the fuel injection amount by which fuel is injected to the engine 41.

Figure 8:
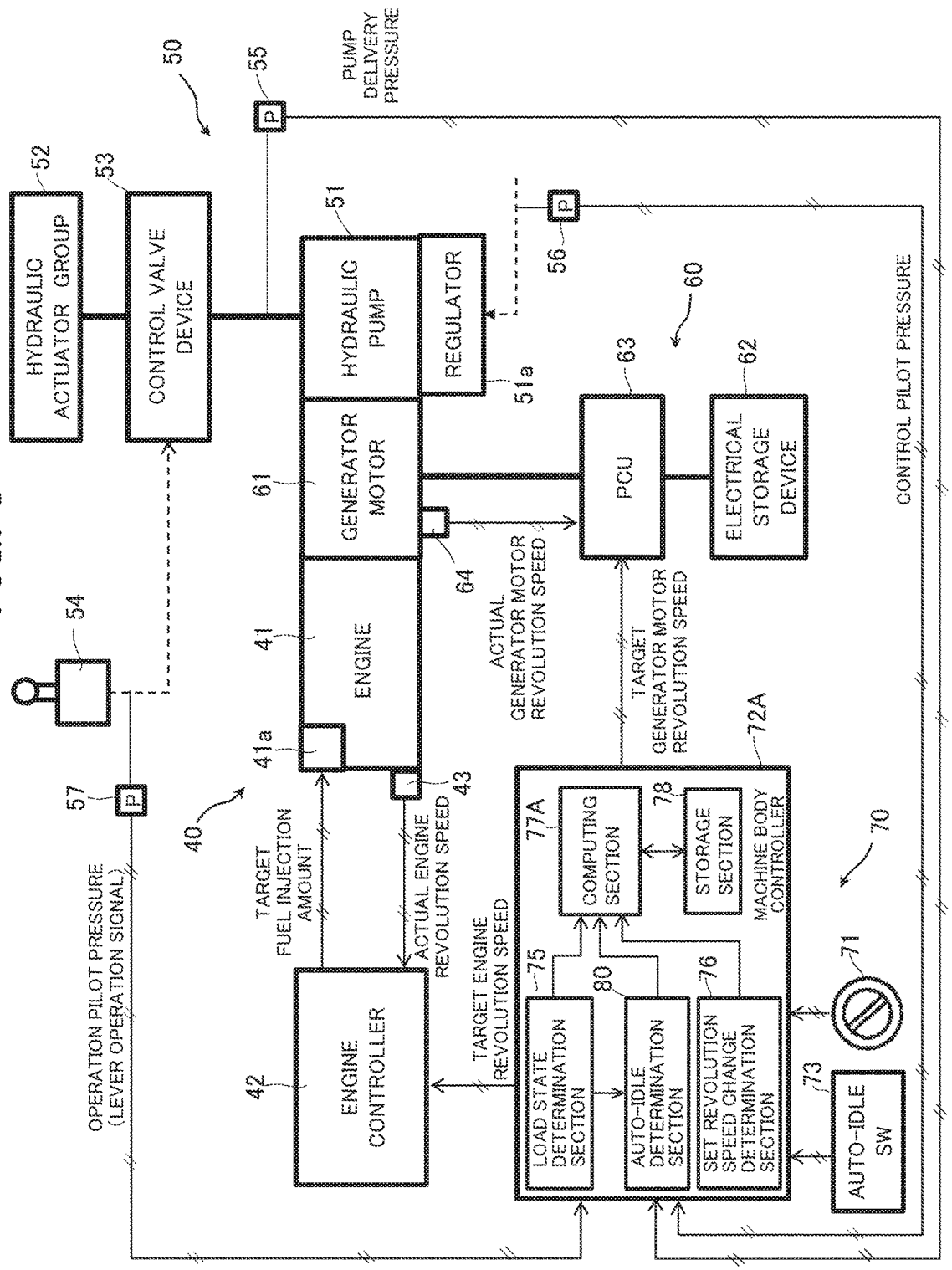
FIG. 8 is a schematic diagram depicting a configuration of a hybrid driving system in a hybrid work machine according to Embodiment 2 of the present invention.

A configuration of a hybrid work machine according to Embodiment 2 of the present invention will next be described with reference to FIG. 8. FIG. 8 is a schematic diagram depicting a configuration of a hybrid driving system in the hybrid work machine according to Embodiment 2 of the present invention. In FIG. 8, the same reference characters as those depicted in FIGS. 1 to 7 denote similar elements; thus, detailed description thereof will be omitted.

The hybrid driving system in the hybrid work machine according to Embodiment 2 of the present invention depicted in FIG. 8 is configured, in addition to the configurations of Embodiment 1, to execute auto-idle control to automatically change the target engine revolution speed from the revolution speed based on the set revolution speed instructed by the EC dial 71 to a preset idle revolution speed (for example, 1200 rpm) in a case where the unloaded state of the engine 41 continues for a predetermined time period. It is thereby possible to suppress a fuel consumption amount in the unloaded state of the engine 41.

Specifically, the hybrid driving system in Embodiment 2 is further configured with an auto-idle switch 73 to change over between validation and invalidation of the auto-idle control. The auto-idle switch 73 is provided within the cabin 22 (refer to FIG. 1) of the hydraulic excavator 1, and is operated to be turned on or off by an operator. The auto-idle switch 73 outputs a validation/invalidation changeover instruction signal to a machine body controller 72A.

The machine body controller 72A is further configured with, as a functional block, an auto-idle determination section 80 that determines whether conditions for the auto-idle control have been satisfied. The conditions for satisfying the auto-idle control include a condition that the unloaded state of the engine 41 continues for a predetermined time period, a condition that the auto-idle switch 73 is changed over to a validation side, and a condition that the idle revolution speed is lower than the set revolution speed instructed by the EC dial 71. If the load state determination section 75 determines that the load of the engine 41 is in an unloaded state, the auto-idle determination section 80 determines whether the predetermined time period has elapsed in such state. In addition, the auto-idle determination section 80 determines whether the auto-idle switch 73 is valid on the basis of the validation/invalidation changeover instruction signal from the auto-idle switch 73. Furthermore, the auto-idle determination section 80 determines the condition of the idle revolution speed by comparing the preset idle revolution speed with the set revolution speed input from the EC dial 71.

If the auto-idle determination section 80 determines that the conditions for the auto-idle control have been satisfied, a computing section 77A of the machine body controller 72A changes the target engine revolution speed from the set revolution speed instructed by the EC dial 71 to the preset idle revolution speed. In this case, the machine body controller 72A outputs the idle revolution speed to the engine controller 42 as the target engine revolution speed. The engine controller 42 controls the revolution speed and the torque of the engine 41 on the basis of the idle revolution speed as the target engine revolution speed.

In the present embodiment, the EC dial 71 and the auto-idle switch 73 that changes over between validation and invalidation of the auto-idle control by an operator's operation configure the target engine revolution speed change instructing device that give instructions on a change in the target engine revolution speed used in the engine controller 42 on the basis of the operator's operation. The case where the target engine revolution speed is changed by the instruction of the target engine revolution speed change instructing device to be lower than the target engine revolution speed set before change is a case where the conditions for the auto-idle control have been satisfied and the target engine revolution speed is changed from the set revolution speed instructed by the EC dial 71 to the lower idle revolution speed.

In a case of executing the auto-idle control in this way, the target engine revolution speed is changed from the set revolution speed instructed by the EC dial 71 to the lower idle revolution speed. This produces a similar situation to that in the case of changing the set revolution speed instructed by the EC dial 71 to be lower than the set revolution speed before change. In the work machine according to the conventional technique, in order to reduce the actual revolution speed of the engine 41 (the set revolution speed instructed by the EC dial 71) to the idle revolution speed, the control to temporarily stop injection of fuel to the engine 41 is exercised to reduce the actual revolution speed of the engine 41. Subsequently, when the actual revolution speed of the engine 41 becomes closer to the idle revolution speed, the actual revolution speed of the engine 41 is controlled to be maintained to the idle revolution speed by starting injection of fuel to the engine 41 again and regulating the fuel injection amount. At this time, a large fluctuation occurs in the output torque of the engine 41 and noise is generated.

In the present embodiment, this problem is overcome by exercising control to reduce the actual revolution speed of the engine 41 while acting the generator motor 61 as the generator and applying a load to the engine 41 similarly to Embodiment 1.

Specifically, the machine body controller 72A performs the computing process for computing the target engine revolution speed and the target generator motor revolution speed by a similar method to that in the case of Embodiment 1 if determining that the conditions for the auto-idle control have been satisfied. A change of the present computing process from the computing process in Embodiment 1 is replacement of the final revolution speed, to which the actual revolution speed of the engine 41 is reduced, from the set revolution speed NEsl after change instructed by the EC dial 71 to an idle revolution speed NEi. For example, the set revolution speed NEsl after change located on a left end depicted in FIG. 5 is changed to the idle revolution speed NEi. The regulation characteristic is changed to Tri in response to the change to the idle revolution speed NEi. Likewise, the target generator motor revolution speed at an intersecting point between the regulation characteristic Tri corresponding to the idle revolution speed NEi and the preset target load torque characteristic TLt is changed to NGti in response to the change to the regulation characteristic Tri.

Operations of the hybrid work machine according to Embodiment 2 of the present invention will next be described with reference to FIGS. 5, 6, 8, and 9. FIG. 9 is a flowchart depicting an example of control procedures by the machine body controller that configures part of the hybrid work machine according to Embodiment 2 of the present invention depicted in FIG. 8. In FIG. 9, the same reference characters as those depicted in FIGS. 1 to 8 denote similar elements; thus, detailed descriptions thereof will be omitted.

In FIG. 9, the machine body controller 72A depicted in FIG. 8 determines whether the auto-idle switch 73 is valid (turned on) (Step S110). If determining in Step S110 that the auto-idle switch 73 is invalid (turned off) (NO), the machine body controller 72A goes to Step S10 and executes the same control flow (Steps S10 to S40) as that in Embodiment 1.

On the other hand, if determining in Step S110 that the auto-idle switch 73 is valid (turned on) (YES), the machine body controller 72A goes to Step S120, in which the machine body controller 72A determines whether the unloaded state of the engine 41 has continued for a predetermined time period. Specifically, if a state, in which the operation pilot pressures detected by the third pressure sensor 57 are equal to or lower than the predetermined threshold, has continued for the predetermined time period, the machine body controller 72A determines YES. Otherwise, the machine body controller 72A determines NO.

If determining in Step S120 that the unloaded state of the engine 41 has not continued for the predetermined time period (NO), the machine body controller 72A goes to Step S40, in which the machine body controller 72A outputs the target engine revolution speed computed in accordance with the machine body condition on the basis of the set revolution speed instructed by the EC dial 71 to the engine controller 42 as described in Embodiment 1 in relation to the operations. The engine controller 42 controls the engine 41 on the basis of the target engine revolution speed computed from the set revolution speed instructed by the EC dial 71. On the other hand, if determining in Step S120 that the unloaded state of the engine 41 has continued for the predetermined time period (YES), the machine body controller 72A goes to Step S130, in which the machine body controller 72A determines whether the auto-idle revolution speed is lower than the set revolution speed instructed by the EC dial 71.

If determining in Step S130 that the auto-idle revolution speed is equal to or higher than the set revolution speed instructed by the EC dial 71 (NO), the machine body controller 72A goes to Step S40 and executes the same procedure. On the other hand, if determining in Step S130 that the auto-idle revolution speed is lower than the set revolution speed instructed by the EC dial 71 (YES), the machine body controller 72A goes to Step S140.

In Step S140, the machine body controller 72A executes a similar computing process to that in Step S30 of the control flow in Embodiment 1. In other words, as previously described in relation to the computing process by the machine body controller 72A, the machine body controller 72A reduces the target engine revolution speed NEtn step by step on the basis of the set revolution speed NEs instructed by the EC dial 71 and the idle revolution speed NEi, and computes the target generator motor revolution speed NGtn by referring to the same regulation characteristic as the regulation characteristic Trn of the engine controller 42 set on the basis of the target engine revolution speed NEtn that is the computing result and to the preset target load torque characteristic TLt (refer to FIG. 5). The machine body controller 72A outputs the target engine revolution speed NEtn and the target generator motor revolution speed NGtn that are the computing results to the engine controller 42 and the PCU 63, respectively, for each computing.

The PCU 63 exercises revolution speed control over the generator motor 61 on the basis of the target generator motor revolution speed NGtn from the machine body controller 72A, and the engine controller 42 controls the engine 41 on the basis of the regulation characteristic having the droop characteristic set on the basis of the target engine revolution speed NEtn from the machine body controller 72A. Therefore, the operating point of the engine 41 moves on the target load torque characteristic TEd as indicated by the open arrow depicted in FIG. 6, similarly to the case of Embodiment 1. In other words, the actual revolution speed of the engine 41 is reduced while acting the generator motor 61 as the generator and applying a load to the engine 41; thus, a large fluctuation in the engine output torque does not occur at the time of speed reduction of the engine 41.

As described above, according to the hybrid work machine according to Embodiment 2 of the present invention, similarly to Embodiment 1 described above, in the case where the conditions for the auto-idle control are satisfied, it is possible to suppress the noise of the engine 41 when the target engine revolution speed is changed to be lower from the set revolution speed indicated by the EC dial 71 to the idle revolution speed while the engine 41 is in an unloaded state.

While an example of applying the hybrid work machine of the present invention to the hydraulic excavator 1 has been illustrated in Embodiments 1 and 2 described above, the present invention is widely applicable to hybrid work machines configured with an engine and a generator motor such as a hydraulic crane and a wheel loader.

Furthermore, the present invention is not limited to the present embodiments and encompasses various modifications. The above embodiments have been described in detail for describing the present invention so that the present invention can be easily understood, and the present invention is not necessarily limited to the hydraulic work machine having all the described configurations. Part of the configurations of a certain embodiment can be partially replaced by the configurations of another embodiment or the configurations of another embodiment can be added to the configurations of the certain embodiment. Furthermore, for some of the configurations of each embodiment, addition, deletion, and/or replacement of the other configurations can be made.

For example, in the embodiments described above, an example of a configuration of the load state determination section 75 to determine whether the load of the engine 41 is in the unloaded state on the basis of the detection signals from the third pressure sensor 57 has been described. Alternatively, the load state determination section 75 can be configured to determine whether the load of the engine 41 is in the unloaded state on the basis of the detection signal from the first pressure sensor 55, that is, the delivery pressure of the hydraulic pump 51. In another alternative, the load state determination section 75 can be configured to determine whether the load of the engine 41 is in an unloaded state on the basis of the detection signal from the second pressure sensor 56, that is, the control pilot pressure input to the regulator 51a of the hydraulic pump 51.

Further, in the embodiments described above, the torque characteristic obtained by incrementing the drag torque characteristic TEd in the unloaded state of the engine 41 by ΔT has been described as an example of the target load torque characteristic TLt to be used by the computing section 77 or 77A to compute the target generator motor revolution speed. Alternatively, a torque characteristic that always indicates an engine torque equal to or higher than the drag torque in the unloaded state of the engine 41 may be set as the target load torque characteristic TLt. In this case, the revolution speed of the engine 41 can be reduced while acting the generator motor 61 as the generator and applying a load to the engine 41. Examples of such a target load torque characteristic TLt include a torque characteristic that the engine output torque indicates the same torque as the engine output torque at the set revolution speed before change instructed by the EC dial 71.

Furthermore, in the embodiments described above, an example in which after outputting the computed target engine revolution speed NEtn to the engine controller 42 and the computed target generator motor revolution speed NGtn to the PCU 63, the machine body controller 72 or 72A starts re-computing the target engine revolution speed NEtn and the target generator motor revolution speed NGtn without determining whether the actual revolution speeds of the engine 41 and the generator motor 61 substantially match the target generator motor revolution speed has been described. Alternatively, the machine body controller 72 or 72A can be configured to start re-computing the target engine revolution speed NEtn and the target generator motor revolution speed NGtn after determining that the actual revolution speeds of the engine 41 and the generator motor 61 match the target generator motor revolution speed computed by the machine body controller 72.

Moreover, in the embodiments described above, an example of a configuration in which the engine revolution speed sensor 43 detects the actual revolution speed of the engine 41 and the generator motor revolution speed sensor 64 detects the actual revolution speed of the generator motor 61 has been described. Alternatively, since the engine 41 and the generator motor 61 are coupled with each other and are driven at the same revolution speed, the hybrid driving system can be configured such that either one of the engine revolution speed sensor 43 and the generator motor revolution speed sensor 64 is provided in the hybrid driving system.

DESCRIPTION OF REFERENCE CHARACTERS

1: Hydraulic excavator (hybrid work machine)
12: Track hydraulic motor (hydraulic actuator)
35: Boom cylinder (hydraulic actuator)
36: Arm cylinder (hydraulic actuator)
37: Bucket cylinder (hydraulic actuator)
41: Engine
42: Engine controller
51: Hydraulic pump
61: Generator motor
62: Electric storage device
63: Power controller
71: Engine control dial (target engine revolution speed change instructing device)
72, 72A: Machine body controller (controller)
73: Auto-idle switch (target engine revolution speed change instructing device)

The invention claimed is:

1. A hybrid work machine comprising:
an engine;
a hydraulic pump driven by the engine;
a hydraulic actuator driven by hydraulic fluid delivered from the hydraulic pump;
a generator motor coupled to the engine, the generator motor being able to act both as a generator and a motor;
an electric storage device that transmits and receives electric power to and from the generator motor;
an engine controller that controls the engine on a basis of a target engine revolution speed;
a power controller that controls action of the generator motor by controlling charge and discharge of the electric storage device;
a controller that controls the engine controller and the power controller; and
a target engine revolution speed change instructing device that gives instructions on a change in the target engine revolution speed to be used in the engine controller on a basis of an operator's operation, wherein
the engine controller controls a revolution speed and an output torque of the engine on a basis of a regulation characteristic set per target engine revolution speed if the target engine revolution speed has been changed by an instruction of the target engine revolution speed change instructing device to be lower than a target engine revolution speed set before change while the engine is in an unloaded state,
the regulation characteristic has a characteristic that the output torque of the engine is increased at a predetermined rate in proportion to a reduction in the revolution speed of the engine, wherein
the controller controls, if the target engine revolution speed has been changed by an instruction of the target engine revolution speed change instructing device to be lower than a target engine revolution speed set before change while the engine is in an unloaded state, the engine controller and the power controller to cause the generator motor to act as the generator on a basis of a same regulation characteristic as the regulation characteristic of the engine controller until an actual revolution speed of the engine is reduced to a revolution speed in response to a target engine revolution speed after the change.

2. The hybrid work machine according to claim 1, wherein
the controller controls the engine controller and the power controller to reduce the revolution speed of the engine in such a manner that an operating point of the engine moves on a torque characteristic obtained by incrementing a drag torque characteristic that is a torque characteristic in the unloaded state of the engine by a predetermined amount if the target engine revolution speed has been changed by the instruction of the target engine revolution speed change instructing device to be lower than the target engine revolution speed set before change while the engine is in an unloaded state.

3. The hybrid work machine according to claim 1, wherein
the target engine revolution speed change instructing device is an operation dial that gives instructions on a set revolution speed of the engine in response to the operator's operation,
the controller computes the target engine revolution speed on a basis of the set revolution speed instructed by the operation dial, and
the controller controls, if the set revolution speed instructed by the operation dial has been changed to be lower than a set revolution speed before change while the engine is in an unloaded state, the engine controller and the power controller to act the generator motor as the generator until the actual revolution speed of the engine is reduced to a revolution speed corresponding to the target engine revolution speed computed on a basis of a set revolution speed after the change.

4. The hybrid work machine according to claim 1, wherein
the target engine revolution speed change instructing device includes: an operation dial that give instructions on a set revolution speed of the engine in response to an operator's operation; and an auto-idle switch that, in response to the operator's operation, changes over between validation and invalidation of auto-idle control to change the target engine revolution speed from the set revolution speed instructed by the operation dial to a preset idle revolution speed, and the controller controls the engine controller and the power controller to act the generator motor as the generator until the actual revolution speed of the engine is reduced to a revolution speed corresponding to the idle revolution speed if the unloaded state of the engine continues for a predetermined time period, the auto-idle switch is changed over to validation, and the idle revolution speed is lower than the set revolution speed instructed by the operation dial.

5. The hybrid work machine according to claim 1, wherein
the controller, if the target engine revolution speed has been changed by the instruction of the target engine revolution speed change instructing device to be lower than the target engine revolution speed set before change while the engine is in an unloaded state,
successively computes the target engine revolution speed in such a manner as to reduce the target engine revolution speed step by step from the target engine revolution speed before the change to the target engine revolution speed after the change,
outputs the computed target engine revolution speed to the engine controller,
successively sets a same regulation characteristic as the regulation characteristic of the engine controller per successively computed target engine revolution speed, and
outputs a revolution speed at an intersecting point between the regulation characteristic and a preset target load torque characteristic to the power controller as a target generator motor revolution speed of the generator motor, and
the power controller controls the generator motor in such a manner that an actual revolution speed of the generator motor matches the target generator motor revolution speed from the controller if the target engine revolution speed has been changed by the instruction of the target engine revolution speed change instructing device to be lower than the target engine revolution speed set before the change while the engine is in an unloaded state.

6. The hybrid work machine according to claim 5, wherein
the target load torque characteristic is a torque characteristic obtained by incrementing a drag torque characteristic that is a torque characteristic in the unloaded state of the engine by a predetermined amount.

* * * * *